United States Patent [19]

Pausch

[11] Patent Number: 5,186,433
[45] Date of Patent: Feb. 16, 1993

[54] ADJUSTABLE ECCENTRIC VALVE

[75] Inventor: Josef Pausch, Minnetonka, Minn.

[73] Assignee: General Resource Corporation, Hopkins, Minn.

[21] Appl. No.: 823,346

[22] Filed: Jan. 21, 1992

[51] Int. Cl.⁵ .............................................. F16K 5/06
[52] U.S. Cl. .................................... 251/309; 251/298
[58] Field of Search ........................ 251/298, 304, 309

[56] References Cited

U.S. PATENT DOCUMENTS

| | | |
|---|---|---|
| 306,972 | 10/1884 | Stiles . |
| 1,566,375 | 12/1925 | Coatalen . |
| 2,477,587 | 8/1949 | Doutt . |
| 2,860,015 | 11/1958 | Matterson . |
| 3,456,916 | 7/1969 | Utzen et al. ........................ 251/309 |
| 3,749,358 | 7/1973 | Bates ................................. 251/298 |
| 4,260,129 | 4/1981 | Groenefeld . |

OTHER PUBLICATIONS

A photocopy of a General Machine Company of New Jersey, Inc.'s brochure entitled "Gemco Dust-Tite Spherical Solids Valves".

Primary Examiner—John C. Fox
Attorney, Agent, or Firm—Palmatier, Sjoquist & Helget

[57] ABSTRACT

A valve which is eccentrically adjustable, wherein the eccentric mating between a valve and valve seat is defined by a fixed eccentric and an adjustable eccentric. The fixed eccentric is provided by a drive shaft for the valve closure member being fixed eccentrically of a central axis of rotation of the valve closure member. The adjustable eccentric is provided by a rotatable eccentric bearing for receiving the drive shaft.

8 Claims, 2 Drawing Sheets

ADJUSTABLE ECCENTRIC VALVE

BACKGROUND OF THE INVENTION

The present invention relates to eccentric valves and, more particularly, to eccentric valves whose eccentricity is adjustable.

An eccentric valve is a valve whose valve closure member is arranged eccentrically with respect to its valve seat. This eccentric arrangement minimizes surface contact between the valve and its valve seat during opening and closing of the valve.

Over a period of use, a valve may break down. For instance, the valve closure member or its valve seat may become misaligned relative the other, or the valve seat or closure member may become worn. Breakdowns occur more often where the valve is operated repeatedly by a valve actuator.

Conventionally, a dysfunctional valve is simply replaced. Alternatively, the valve may be repaired such as by the replacement of the valve seat or the valve closure member. However, after such repair the valve may not work properly because, for example, realignment between the valve seat and its closure member may be relatively difficult.

SUMMARY OF THE INVENTION

An object of the present invention is to provide means for aligning an eccentric valve.

Another object of the present invention is to provide means for realigning an eccentric valve.

Another object of the present invention is to provide means for adjusting the eccentricity of an eccentric valve.

A feature of the present invention is a drive shaft which drives and is fixed eccentrically to a valve closure member. This arrangement is referred to as a fixed eccentric. In other words, the valve opening is eccentric relative to the disc closure member.

Another feature of the present invention is a rotatable and thus adjustable eccentric bearing for an already eccentric drive shaft. This rotatable eccentric bearing is referred to as an adjustable eccentric.

In operation, rotation of the eccentric bearing changes the position of the axis of the eccentric drive shaft, thereby adjusting the eccentricity between the valve closure member and its valve seat. After being rotated, the bearing is fixable relative to the valve by an integral annular flange extending from the bearing and being pinchable between a backing plate and the valve.

An advantage of the present invention is that eccentric valves may be quickly and simply adjusted. Adjustment of the eccentricity of the valve calls for only one step: rotation of the eccentric bearing.

Another advantage of the present invention is an eccentric valve with an extended operating life. Instead of discarding a dysfunctional misaligned valve, the valve is simply realigned.

Another advantage is that the valve is inexpensive and simple to manufacture. An initial alignment of the eccentricity between the valve closure member and its valve seat is less critical than with conventional eccentric valves whose fixed initial alignment must last for the entire life of the valve.

DETAILED DESCRIPTION OF THE PREFERRED EMBODIMENTS

Figure 1:
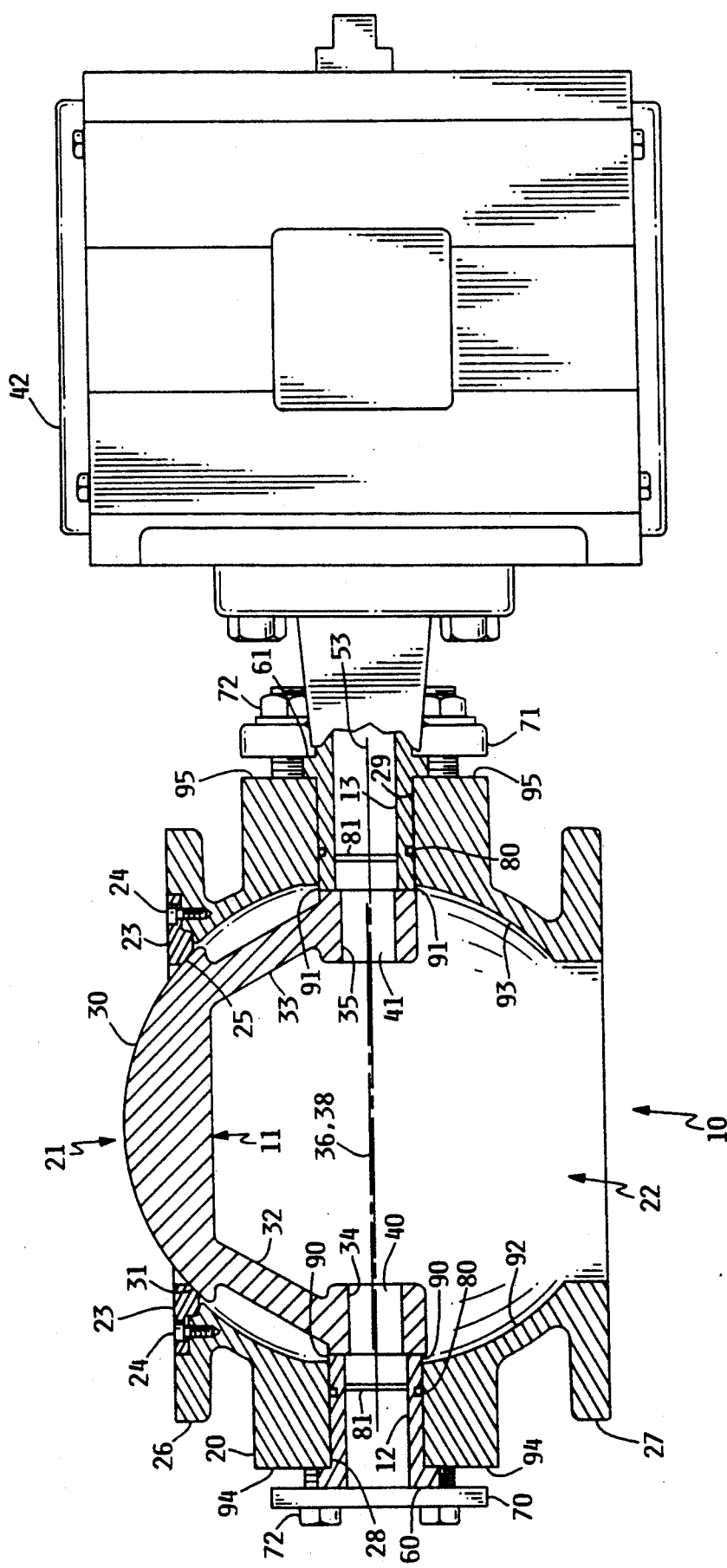
FIG. 1 is a section view of the present eccentric ball valve connected to a valve actuator which is shown in elevation.

As shown in FIG. 1, the present eccentric ball valve is indicated in general by the reference numeral 10 and includes as its principal components a valve closure member 11, which may be referred to as a fixed eccentric, and a pair of rotatable eccentric bearings 12, 13 which as a pair may be referred to an adjustable eccentric. Rotation of the eccentric bearings 12, 13 adjusts the eccentricity of the eccentric ball valve 10.

The eccentric ball valve 10 includes a valve body 20 having an inlet port 21 and an outlet port 22. The inlet port 21 is defined by a retaining ring 23 which is removably affixed to the valve body 20 via threaded pin connectors 24. The retaining ring 23 includes a spherical segment valve seat 25 for mating with the surface 31 of the valve closure member 11 when closed. The valve body 20 further includes coupling flanges 26, 27 and transverse bearing apertures 28, 29.

Figure 2:
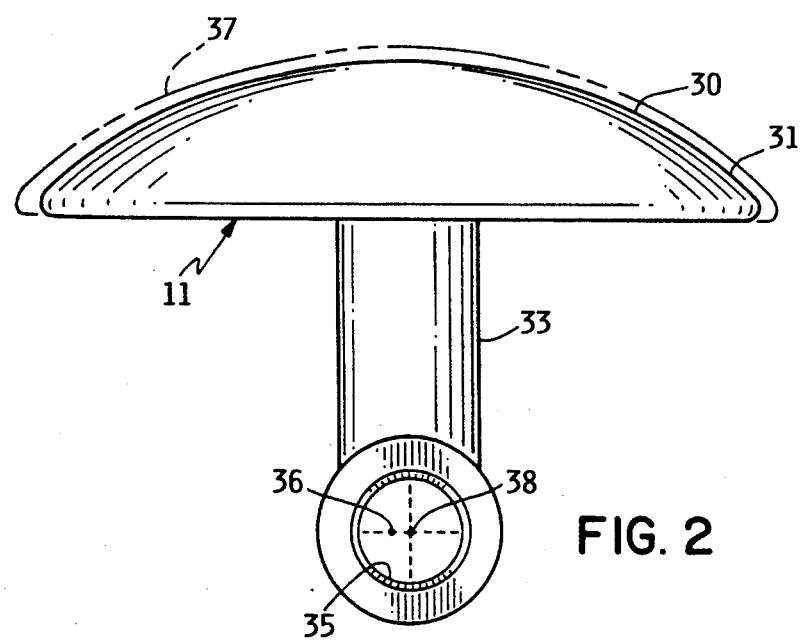
FIG. 2 is a detail view of the eccentric closure member or fixed eccentric of the ball valve of FIG. 1.

As shown in FIGS. 1 and 2, the valve closure member 11 includes a spherical segment valve 30 with a spherical seating surface 31, and a pair of support arms 32, 33. A pair of respective drive shaft receiving apertures 34, 35 are drilled along a common valve or drive shaft axis 38 in the support arms 32, 33. An arc 37 has a radius extending from a point along the drive axis 38. Spherical surface 31 is formed about a spherical arc having a radius extending from a point along a center axis line 36 of closure member 11. Accordingly, since drive shaft axis 38 is offset from or eccentric of center axis 36, the closure member is referred to as a fixed eccentric.

It should be noted that the spacial relationship between the axes 38, 36 is exaggerated in FIG. 2. The actual distance between the two parallel axes may be less than one tenth (1/10) of an inch.

A passive shaft 40 is affixed in shaft aperture 34 of support arm 32 and extends therefrom to the eccentric bearing 12. A drive shaft 41 is affixed in drive shaft aperture 35 of support arm 33, extends through the eccentric bearing 13, and is affixed to a pneumatic valve actuator 42.

Figure 3:
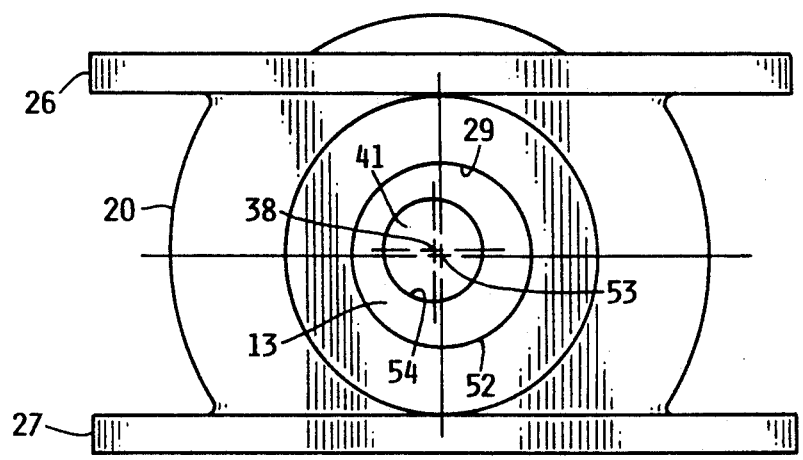
FIG. 3 is an elevation, partially schematic view of the rotatable eccentric bearing or adjustable eccentric of the eccentric ball valve of FIG. 1.
Figure 4:
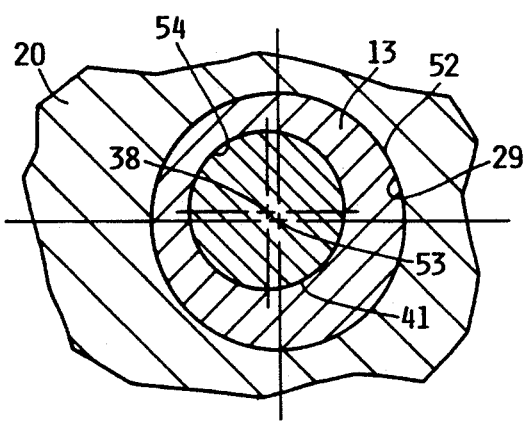
FIG. 4 is a detail section view of the rotatable eccentric bearing or adjustable eccentric of FIG. 3.

As shown in FIGS. 1, 3, and 4, the pair of eccentric bearings 12, 13 are affixed in the respective bearing apertures 28, 29 for receiving the shafts 40, 41. Each of the eccentric bearings 12, 13 includes an outer cylindrical surface 52 having a central axis 53 and an inner cylindrical surface 54 having a central axis, which is coincidental with the drive shaft axis 38 and shafts 40, 41 and which is eccentric of or offset from the axis 53 of the outer cylindrical surface 52. The shafts 40, 41 slidably engage this inner surface 54 and rotation of the eccentric bearings 12, 13 adjusts the axial position 38 of the shafts 40, 41 and hence the position of the seating surface 31 relative to its valve seat 25.

Each of the eccentric bearings 12, 13 includes an integral annular flange 60, 61 for being pinched to the valve body 20 for fixing the positions of their respective bearings 12, 13 and hence the eccentricity of the ball valve 10. Each of the flanges 60, 61 is pinched between the valve body 20 and a respective annular backing plate 70, 71. The backing plates 70, 71 are incrementally drawable toward and away from the valve body 20 via threaded fasteners 72. It should be noted that the flange 60 of the bearing 12 for the passive shaft 40 is disposed on the end of its bearing 12. Flange 61 of the bearing 13 for the drive shaft 41 is more medially disposed as the drive shaft 41 extends through the backing plate 71 to the valve actuator 42.

It should be noted that the eccentric flange bearings 12, 13 are sealed relative to the valve body 20 via O-rings 80 and relative the shafts 40, 41 via O-rings 81.

It should further be noted that each of the respective bearing 12, 13 include inner ends 90, 91 which extend past respective housing inner surfaces 92, 93 to engage the support arms 32, 33 of the valve closure member 121. In other words, the bearings 12, 13 act as thrust bearings upon which the valve closure member 11 rides and rotates to keep the valve closure member 11 away from the housing inner surfaces 92, 93. When bearings inner ends 90, 91 wear down, housing outer annular surfaces 94, 95 may be machined down to compensate for such wear and to maintain the thrust of the bearings 12, 13.

In operation, to align the ball valve 10, the valve 10 is closed such that the spherical seating surface 31 of the closure member 11 is seated as closely as possible with its spherical valve seat 25. Subsequently, the rotatable eccentric bearings 12, 13 are rotated in their respective bearing aperture 28, 29 until the spherical seating surface 31 is aligned with its spherical valve seat 25. The fasteners 72 are then tightened to pinch the flanges 60, 61 between the backing plates 70, 71 and the valve body 20 to fix the eccentric bearings 12, 13 relative to the valve body 20 to in turn fix the axes of the drive shafts 40, 41 and the position of the seating surface 31 relative to its valve seat 25 to consequently establish the eccentricity of the ball valve 10. Realignment of the eccentricity of the valve 10 includes merely repeating this procedure after the backing plates 70, 71 have been loosened.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An eccentric valve comprising:
   a) a valve body with inlet and outlet ports and a bearing hole having a bearing hole axis;
   b) one of the ports having a spherical segment valve seat;
   c) a spherical segment closure member engageable to the valve seat for closing the valve and including a spherical surface, the closure member being rotatable about a valve axis, and the spherical surface formed from a radius extending from a point offset from said valve axis; the closure member having a valve shaft extending along said valve axis; and
   d) not more than one eccentric bearing rotatable in the bearing hole for at least 90°, said bearing having a longitudinal opening for receiving said valve shaft, said longitudinal opening being offset from said bearing hole axis whereby rotation of the eccentric bearing adjusts the relative position between the valve axis and the bearing axis and thus eccentricity between the valve seat and closure member.

2. The eccentric valve according to claim 1, wherein the eccentric bearing is rotatable in the bearing hole for 360° to further adjust the eccentricity between the valve seat and closure member.

3. The eccentric valve according to claim 1, further comprising fixing means for fixing the eccentric bearing to the valve body.

4. The eccentric valve according to claim 3, wherein the fixing means comprises a flange on the eccentric bearing fixedly adjustable relative to the valve body.

5. The eccentric valve according to claim 4, wherein the valve body includes a plate for clamping the flange against the valve body.

6. An eccentric valve comprising:
   a) a valve body with inlet and outlet ports and a bearing hole having a bearing hole axis;
   b) one of the ports having a valve seat;
   c) a closure member engageable to the valve seat for closing the valve and including a seating surface, the closure member being rotated about an eccentric axis of rotation; the closure member having a valve shaft extending along said eccentric axis of rotation; and
   d) not more than one eccentric bearing rotatable in the bearing hole for at least 90°, said bearing having a longitudinal opening for receiving said valve shaft, said longitudinal opening being offset from said bearing hole axis whereby rotation of the eccentric bearing adjusts the relative position between the valve axis and the bearing hole axis and thus eccentricity between the valve seat and closure member.

7. The eccentric valve of claim 6, wherein the valve seat and closure member comprise respective spherical segments, and the seating surface of the closure member being spherical, said spherical seating surface formed from a radius extending from a point offset from said eccentric axis of rotation.

8. The eccentric valve according to claim 6, wherein the eccentric bearing is rotatable in the bearing hole for 360° to further adjust the eccentricity between the valve seat and closure member.

* * * * *